W. O. LONG.
DRAW BAR FOR HARROWS.
APPLICATION FILED DEC. 14, 1918.
1,314,679.
Patented Sept. 2, 1919.
2 SHEETS—SHEET 1.
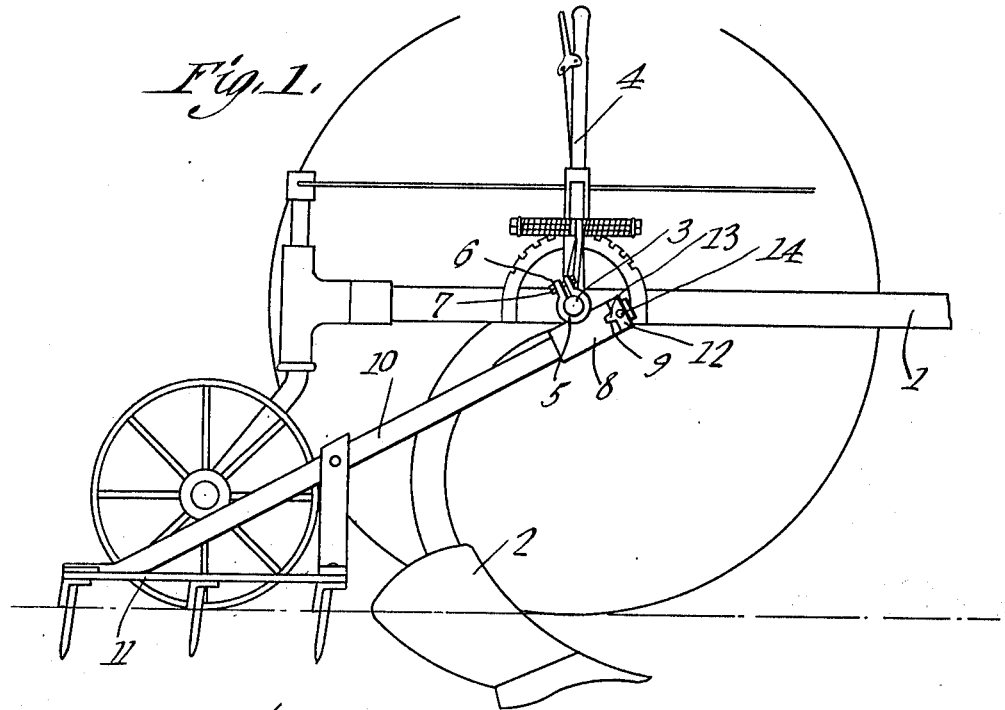
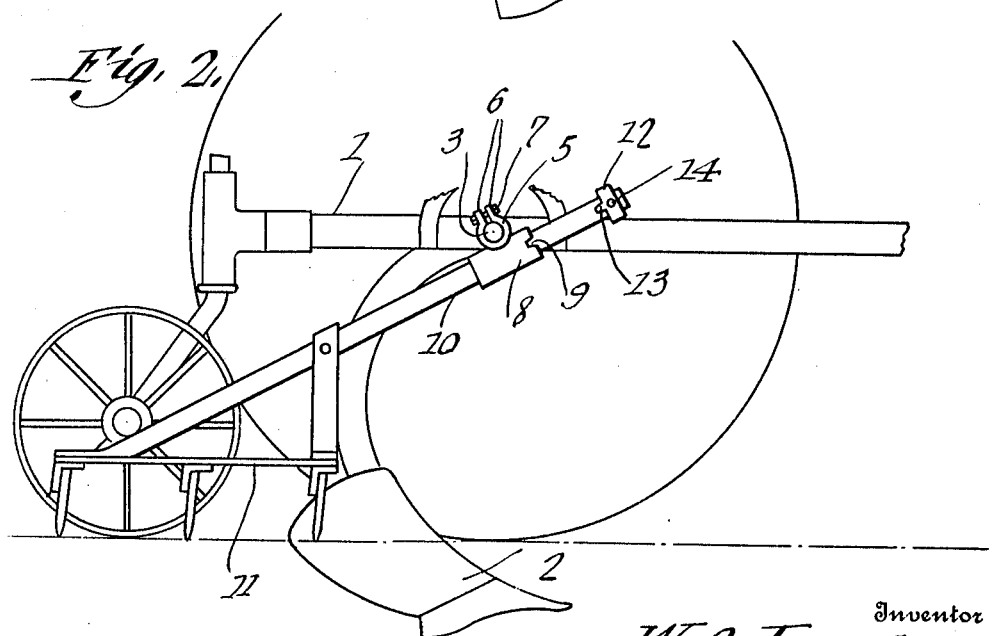
Witness
Inventor
W. O. Long
By C. A. Snow & Co.
Attorneys

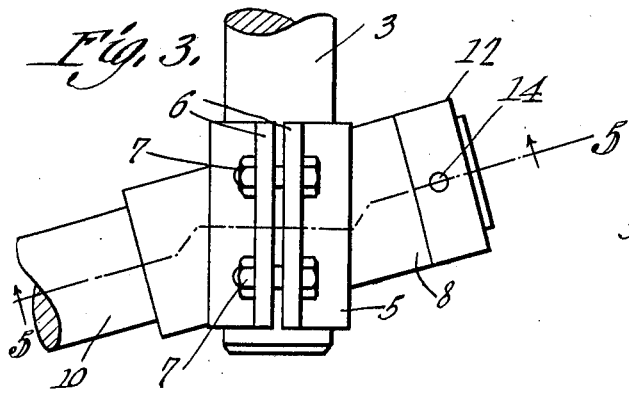
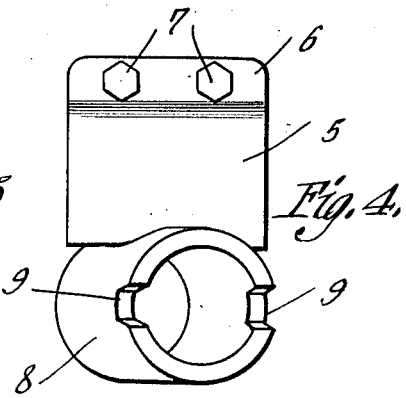
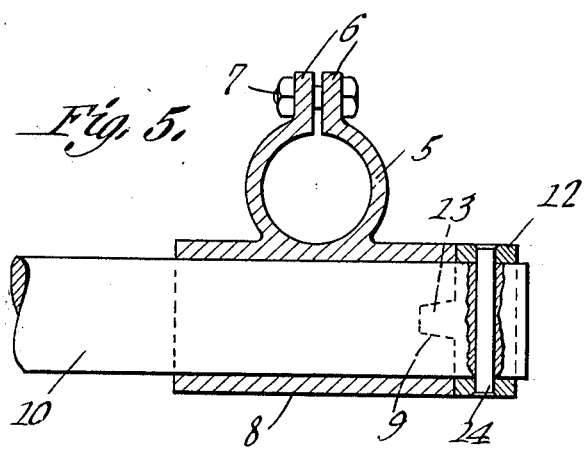
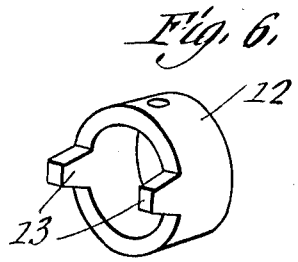

UNITED STATES PATENT OFFICE.

WILLARD O. LONG, OF MANSFIELD, OHIO.

DRAW-BAR FOR HARROWS.

1,314,679. Specification of Letters Patent. Patented Sept. 2, 1919.

Application filed December 14, 1918. Serial No. 266,837.

*To all whom it may concern:*

Be it known that I, WILLARD O. LONG, a citizen of the United States, residing at Mansfield, in the county of Richland and State of Ohio, have invented a new and useful Draw-Bar for Harrows, of which the following is a specification.

This invention relates to draw bars for harrows of that type shown, for example, in my co-pending application Number 243,848, wherein the toothed member of the harrow is connected to the plow structure by means of a bar adapted to be swung upwardly and downwardly relatively to the plow and having yielding means for holding the harrow pressed against the soil. One of the objects of the present invention is to provide a connection between the draw bar of the harrow and the bar shifting means whereby, when the plow is backed without lifting the harrow, the draw bar will be caused to shift automatically thereby to raise the harrow and allow it to pass over and out of contact with the surface of the ground. A further object is to provide means whereby, when the harrow is in use as such, the draw bar will be held securely against rotation, thus to hold the harrow against lateral tilting. Another object is to provide means for holding the harrow, when raised, in position to be reset upon the ground as soon as the plow moves forward and a furrow slice is directed against the harrow.

With the foregoing and other objects in view which will appear as the description proceeds, the invention consists of certain novel details of construction and combinations of parts which will be hereinafter more fully described and claimed, it being understood that various changes may be made in the construction and arrangement of the parts without departing from the spirit or sacrificing any of the advantages of the invention as set forth in the appended claims.

In the accompanying drawings the preferred form of the invention has been shown.

In said drawings—

Figure 1 is a side elevation of a portion of a plow structure having the harrow attachment applied thereto, said attachment being in active position.

Fig. 2 is a similar view showing the harrow supported in raised position, as when the plow is backed.

Fig. 3 is a plan view of the connection between the draw bar and its operating means.

Fig. 4 is a front elevation of the coupling sleeve of the said connection.

Fig. 5 is a section on line 5—5, Fig. 3 part of the draw bar being shown in elevation and part being broken away.

Fig. 6 is a perspective view of the locking collar of the draw bar.

Referring to the figures by characters of reference, 1 designates a wheel supported structure to which is connected a plow 2. A short shaft 3 extends laterally from the structure and is adapted to be operated by a hand lever 4. Embracing the shaft 3 is a split sleeve 5 having ears 6 engaged by bolts 7 whereby the sleeve can be clamped to the shaft at any point desired so as to rotate with the shaft. Formed integral with the split sleeve 5 is a guide sleeve 8 which is obliquely disposed relative to the sleeve 5 and is provided at its forward end with opposed notches 9. A draw bar 10 is slidably mounted in the sleeve 8 and to the rear end thereof is fastened a harrow structure 11 while to its front end is secured a locking collar 12 having opposed tapered lugs 13 extending toward sleeve 8. Collar 12 may be fastened to the draw bar in any manner desired, as by means of a pin 14 extending therethrough.

When the plow is moved forward the harrow will be drawn along the ground and the lugs 13 held seated in the notches 9. Thus rotation of the bar 10 within the sleeve 8 is prevented and the harrow will operate efficiently back to one side of the plow. Should the plow be moved rearwardly without first swinging the bar 10 upwardly by means of the lever 4, the bar 10 would slide within the sleeve 8 and be guided upwardly thereby until the harrow 11 would be raised out of engagement with the ground whereupon the front portion of the harrow would rest upon the moldboard of the plow as shown in Fig. 2. When the plow is again moved forward the furrow slice will strike the raised harrow, thrust it off of the mold board and cause the teeth of the harrow to reëngage the ground. Draw bar 10 will move back in the sleeve 8 and the tapered lugs 13 will become seated in the notches 9, thereby to hold the draw bar against rotation.

What is claimed is:—

1. A harrow attachment for plows including a coupling sleeve, a guide sleeve carried thereby, a harrow structure, a draw bar extending from said structure and slidable within the guide sleeve, and coöperating means upon the draw bar and guide sleeve and held in engagement by the drag upon the harrow structure for fixedly holding the bar against rotation when in normal position.

2. A harrow attachment for plows including a guide sleeve, means for connecting the same to a support, a draw bar slidable within the sleeve, a harrow section at one end of the bar, and coöperating means upon the bar and sleeve and held in engagement by the drag upon the harrow structure for holding the bar fixedly against rotation during the forward movement of the harrow.

3. A harrow attachment for plows including a guide sleeve, means for adjustably connecting the same to a support, there being a notch in one end of the sleeve, a draw bar slidable within the sleeve, a harrow structure at the rear end of the bar, and means at the front end of the bar for entering the notch and holding the bar against rotation when the harrow structure is in use.

4. A harrow attachment for plows including a guide sleeve, means for connecting the sleeve to a support for angular and lateral adjustment, a draw bar slidable within the sleeve, a harrow structure at the rear end of the bar, and means upon the front end of the bar and held in engagement with the sleeve by the drag upon the harrow structure for holding the bar fixedly against rotation when the harrow is in active position.

In testimony that I claim the foregoing as my own, I have hereto affixed my signature in the presence of two witnesses.

WILLARD O. LONG.

Witnesses:
E. H. BLANKART,
S. A. STRICKLAND.

Copies of this patent may be obtained for five cents each, by addressing the "Commissioner of Patents, Washington, D. C."